United States Patent
Zhu et al.

(10) Patent No.: US 8,284,570 B2
(45) Date of Patent: Oct. 9, 2012

(54) METHOD AND SYSTEM OF SYNTONIC CIRCUIT MODULATION CONTROLLING

(75) Inventors: Chunhui Zhu, Shenzhen (CN); Haizhou Zhao, Shenzhen (CN); Zhiyu Liu, Shenzhen (CN)

(73) Assignee: Emerson Network Power, Energy Systems, North America, Inc., Lorain, OH (US)

( * ) Notice: Subject to any disclaimer, the term of this patent is extended or adjusted under 35 U.S.C. 154(b) by 669 days.

(21) Appl. No.: 12/297,044

(22) PCT Filed: Feb. 13, 2007

(86) PCT No.: PCT/CN2007/000509
§ 371 (c)(1),
(2), (4) Date: Jul. 23, 2009

(87) PCT Pub. No.: WO2007/118401
PCT Pub. Date: Oct. 25, 2007

(65) Prior Publication Data
US 2009/0303750 A1 Dec. 10, 2009

(30) Foreign Application Priority Data
Apr. 14, 2006 (CN) .......................... 2006 1 0074794

(51) Int. Cl.
*H02M 3/335* (2006.01)
(52) U.S. Cl. ...................... 363/21.02; 363/147
(58) Field of Classification Search ............... 363/21.02, 363/21.03, 147
See application file for complete search history.

(56) References Cited

U.S. PATENT DOCUMENTS

| 4,136,315 A | 1/1979 | Kuhn |
| 4,888,821 A | 12/1989 | Hamp, III et al. |
| 4,964,028 A | 10/1990 | Spataro |
| 5,640,313 A * | 6/1997 | Takehara et al. ............... 363/97 |

(Continued)

FOREIGN PATENT DOCUMENTS
CN 2433774 Y 6/2001
(Continued)

OTHER PUBLICATIONS

European Search Report for European Patent Application No. 07 71 0934.

(Continued)

*Primary Examiner* — Gary L Laxton
(74) *Attorney, Agent, or Firm* — Harness, Dickey & Pierce, P.L.C.

(57) ABSTRACT

A modulation control method and system for a resonance circuit that generally relate to electrical communication technique. In the system, a controlling chip of the resonance circuit is connected to associated controlling means providing voltage matching and resistance control. The controlling means provides controlling parameters to the chip in accordance with input voltage. The controlling chip modulates the resonance circuit accordingly. A phase-shifting pulse width modulation controlling chip or a pulse width modulation controlling chip is connected to a voltage matching module and a resistance controlling module, wherein the voltage matching module matches the voltage ranges and the resistance controlling module adjusts the equivalent resistance of RT terminal to the external as the voltage of loop circuit changes accordingly. In the method, a controlling chip is used to realize a controlling mode of frequency modulation, pulse width modulation, and combination thereof with respect to the resonance circuit through the voltage matching module and the resistance controlling module. The present invention is advantageous in low cost and high efficiency.

27 Claims, 9 Drawing Sheets

U.S. PATENT DOCUMENTS

| | | | |
|---|---|---|---|
| 5,754,414 A | | 5/1998 | Hanington |
| 5,847,942 A | * | 12/1998 | Bazinet et al. ............... 363/25 |
| 7,212,415 B2 | * | 5/2007 | Osaka ..................... 363/21.02 |
| 2005/0200302 A1 | | 9/2005 | Terada et al. |

FOREIGN PATENT DOCUMENTS

| | | |
|---|---|---|
| DE | 102004006004 | 6/2005 |
| WO | WO-2007138344 | 12/2007 |

OTHER PUBLICATIONS

International Search Report for International Patent Application No. PCT/CN2007/000509, dated Jun. 7, 2007.

* cited by examiner

METHOD AND SYSTEM OF SYNTONIC CIRCUIT MODULATION CONTROLLING

TECHNICAL FIELD

The present invention generally relates to electrical communication technique, and more particularly, to a modulation control method and system for a resonance circuit.

BACKGROUND

For existing converters, required output voltage can be obtained by modulating operating frequency of a switch tube in the resonance circuit in a PFM (Pulse Frequency Modulation) mode.

Taking series resonance converter as an example, resonant transformation technique is applied to series resonance DC/DC converter. Since resonant elements are in sinusoidal resonance state, voltage on the switch tube passes zero naturally, and zero voltage turn-on can be realized. At the same time, reverse recovery of output rectifier diodes can be eliminated, and loss of power supply can be reduced and efficiency can be improved. In such topologies, typically, output voltage can be stabilized by modulating operating frequency of a switch tube in a PFM mode. FIG. 1 is the basic form of a full bridge type of series resonance DC/DC converter, wherein the relationship between an output voltage gain M and the operating frequency is:

$$M = \frac{V_o}{V_{in}} = \frac{0.5}{Qs\left|\frac{f}{f_o} - \frac{f_o}{f}\right|} \quad (a)$$

$$f_o = \frac{1}{2\pi\sqrt{Lr \cdot Cr}} \quad (b)$$

$$Qs = \frac{2\pi f_o L_r P_o}{U_o^2} \quad (c)$$

In the above equations (a), (b) and (c), Lr is the value of resonant inductance, and f is the operating frequency of the switch tube, and Cr is the value of resonant capacitance, and Po is an output power.

From equation (a), it can be seen that the higher the operating frequency is, the lower the voltage gain M is when the operating frequency is higher than the resonant frequency. Similarly, the lower the operating frequency is, the lower the voltage gain M is when the operating frequency is lower than the resonant frequency.

As to series resonant converter, there is a problem that it is difficult to stabilize the voltage output in light load or no load state. Output voltage in series resonant topologies decreases as switching frequency increases. When the load of series resonant converter decreases to a light load or no load, the output voltage is stabilized by modulating the operating frequency. Once the operating frequency increases to a certain value, regulating capability of the operating frequency to the output voltage decreases significantly, and the output voltage may even be increased.

Thus, in order to stabilize the output voltage, it is necessary to raise the operating frequency. However, excessively high operating frequency or excessively wide regulating range will make it more difficult to design magnetic elements. Furthermore, the higher the operating frequency is, the greater the circuit loss is. In power supply industry, there are some designs in which dead load is applied on an output terminal in order to stabilize the output voltage in light load or no load state. However, this will increase the no load loss of the power supply and reduce efficiency of the power supply. Also, similar problems exist in half bridge and full bridge series resonance circuits.

In conclusion, simple variable frequency control will result in excessively high operating frequency and excessively wide regulating range, and will make it more difficult to design the magnetic elements, and lower the efficiency of the power supply as well. So, simple variable frequency control can not meet the requirement of a stable output voltage of a converter in light load and no load state.

SUMMARY OF THE INVENTION

An object of the present invention is to provide a modulation control method and system for a resonance circuit of low cost and high efficiency, so as to solve the problem in the prior art that simple variable frequency control will result in excessively high operating frequency and excessively wide regulating range, and will make it more difficult to design the magnetic elements, and lower the efficiency of the power supply.

A modulation control system for a resonance circuit of the present invention, wherein a controlling chip of the resonance circuit is connected to an associated controlling means that provides voltage matching and resistance control to the controlling chip, the controlling means providing controlling parameters to the modulating controlling chip in accordance with an input voltage, the controlling chip modulating the resonance circuit accordingly.

The controlling chip is a phase-shift pulse-width modulation controlling chip, a PWM generator and oscillator of which are connected to a voltage matching module and a resistance controlling module of the controlling means, respectively; the voltage matching module and the resistance controlling module providing the controlling parameters to the phase-shift pulse-width modulation controlling chip in accordance with the input voltage; the phase-shift pulse-width modulation controlling chip modulating the resonance circuit accordingly.

Both the voltage matching module and the resistance controlling module use a loop circuit voltage Vloop as the input voltage;

The voltage matching module matches a phase-shift voltage interval corresponding to the loop circuit voltage Vloop with a voltage range in which the phase is shifted by the PWM generator of the phase-shift pulse-width modulation controlling chip;

The resistance controlling module is connected between the loop circuit voltage Vloop and the oscillator of the phase-shift pulse-width modulation controlling chip, such that an equivalent resistance of the oscillator to the external is regulated accordingly as the loop circuit voltage Vloop changes.

The voltage matching module comprises an operational amplifier U701, a first voltage dividing sub-module and a current limiting circuit, and wherein, a resistor R714 is connected between an inverting terminal of the operational amplifier U701 and ground, while a resistor R711 is connected between the inverting terminal of the operational amplifier U701 and an output terminal;

a non-inverting terminal of the operational amplifier U701 is connected to a voltage dividing terminal of the first voltage dividing sub-module;

the current limiting circuit is connected between an output terminal of the operational amplifier U701 and the PWM generator of the phase-shift pulse-width modulation controlling chip.

The resistance controlling module comprises a second voltage dividing sub-module, a resistor R703 being connected between a voltage dividing terminal of the second voltage dividing sub-module and the oscillator of the phase-shift pulse-width modulation controlling chip.

The controlling chip is a pulse-width modulation controlling chip; a COMP terminal and a RT terminal of which is connected to a voltage matching module and a resistance controlling module of the controlling means, respectively; the voltage matching module and the resistance controlling module provide the controlling parameters to the pulse-width modulation controlling chip in accordance with the input voltage, the pulse-width modulation controlling chip modulates the resonance circuit accordingly.

Both the voltage matching module and the resistance controlling module use the loop circuit voltage Vloop as the input voltage;

The voltage matching module matches a width-modulated voltage interval corresponding to the loop circuit voltage Vloop with a voltage range in which the phase is width-modulated by the COMP terminal of the pulse-width modulation controlling chip;

The resistance controlling module is connected between the loop circuit voltage Vloop and the RT terminal of the pulse-width modulation controlling chip such that an equivalent resistance of the RT terminal to the external is regulated accordingly as the loop circuit voltage Vloop changes.

The voltage matching module comprises an operational amplifier U701, a first voltage dividing sub-module and a current limiting circuit, and wherein, a resistor R714 is connected between an inverting terminal of the operational amplifier U701 and ground, while a resistor R711 is connected between the inverting terminal of the operational amplifier U701 and an output terminal;

a non-inverting terminal of the operational amplifier U701 is connected to a voltage dividing terminal of the first voltage dividing sub-module;

the current limiting circuit is connected between the output terminal of the operational amplifier U701 and the COMP terminal of the pulse-width modulation controlling chip.

The resistance controlling module comprises a second voltage dividing sub-module, wherein a resistor R703 is connected between a voltage dividing terminal of the second voltage dividing sub-module and the oscillator of the phase-shift pulse-width modulation controlling chip.

The first voltage dividing sub-module comprises series resistors R712 and R713, and is connected between the loop circuit voltage and the ground.

The second voltage dividing sub-module comprises series resistors R701 and R702, and is connected between the loop circuit voltage and the ground.

The resistance controlling module further comprises a voltage-comparing sub-module, that generates a reference level Vref, and wherein a first diode D702 is connected between the reference level Vref and the input terminal of the second voltage-dividing sub-module 31, while a second diode D701 is connected between the loop circuit voltage Vloop and the input terminal of the second voltage-dividing sub-module 31, with cathodes of the first diode D702 and the second diode D701 being connected with the second voltage-dividing sub-module.

A modulation control method for a resonance circuit, wherein: a phase-shift pulse-width modulation controlling chip is used so as to realize controlling modes of frequency-modulation, width-modulation and combination thereof for the resonance circuit through a voltage matching module and a resistance controlling module.

The method comprises the following steps:

AA1. When a loop circuit voltage Vloop operates in a first interval, the loop circuit voltage Vloop causes the resistance controlling module to act on the phase-shift pulse-width modulation controlling chip to generate frequency-modulating control; and at the same time, the loop circuit voltage Vloop causes the voltage matching module to act on the phase-shift pulse-width modulation controlling chip to generate width-modulating control; and AA2. When the loop circuit voltage Vloop operates in a second interval, the loop circuit voltage Vloop causes the voltage matching module to act on the phase-shift pulse-width modulation controlling chip to generate a maximum duty ratio Dmax, and the loop circuit voltage Vloop causes the resistance controlling module to act on the phase-shift pulse-width modulation controlling chip to generate frequency-modulating control.

The method comprises the following steps:

BA1. When a loop circuit voltage Vloop operates in a first interval, the resistance controlling module generates a constant equivalent resistance to the phase-shift pulse-width modulation controlling chip, and causes it to output a maximum pulse frequency fmax, and the loop circuit voltage Vloop causes voltage matching module to act on the phase-shift pulse-width modulation controlling chip to generate width-modulating control;

BA2. When the loop circuit voltage Vloop operates in a second interval, the loop circuit voltage Vloop causes the resistance controlling module to act on the phase-shift pulse-width modulation controlling chip to generate frequency-modulating control; and at the same time, the loop circuit voltage Vloop causes the voltage matching module to act on the phase-shift pulse-width modulation controlling chip to generate width-modulating control; and BA3. When the loop circuit voltage Vloop operates in a third interval, the loop circuit voltage Vloop causes the voltage matching module to act on the phase-shift pulse-width modulation controlling chip to generate a maximum duty ratio Dmax, and the loop circuit voltage Vloop causes the resistance controlling module to act on the phase-shift pulse-width modulation controlling chip to generate frequency-modulating control.

The maximum duty ratio is 50%.

The first interval is a phase-shift voltage interval of the loop circuit voltage Vloop when the resonance circuit is in light load or no load state.

The third interval is a phase-shift voltage interval of the loop circuit voltage Vloop when the resonance circuit is in a heavy load state.

A modulation control method for a resonance circuit, characterized in that a pulse-width modulation controlling chip is used so as to realize controlling modes of frequency-modulation, width-modulation and combination thereof for the resonance circuit through a voltage matching module and a resistance controlling module.

The method comprises the following steps:

AB1. When a loop circuit voltage Vloop operates in a first interval, the loop circuit voltage Vloop causes the resistance controlling module to act on the pulse-width modulation controlling chip to generate frequency-modulating control; and at the same time, the loop circuit voltage Vloop causes the voltage matching module to act on the pulse-width modulation controlling chip to generate width-modulating control; and AB2. When the loop circuit voltage Vloop operates in a second interval, the loop circuit voltage Vloop causes the voltage matching module to act on the pulse-width modulation controlling chip to generate a maximum duty ratio Dmax, and the loop circuit voltage Vloop causes the resistance controlling module to act on the pulse-width modulation controlling chip to generate frequency-modulating control.

The method comprises the following steps:

BB1. When the loop circuit voltage Vloop operates in a first interval, the resistance controlling module generates a constant equivalent resistance to the pulse-width modulation controlling chip, and causes it to output a maximum pulse frequency fmax, and the loop circuit voltage Vloop causes voltage matching module to act on the pulse-width modulation controlling chip to generate width-modulating control;

BB2. When the loop circuit voltage Vloop operates in a second interval, the loop circuit voltage Vloop causes the resistance controlling module to act on the pulse-width modulation controlling chip to generate frequency-modulating control; and at the same time, the loop circuit voltage Vloop causes the voltage matching module to act on the pulse-width modulation controlling chip to generate width-modulating control; and BB3. When the loop circuit voltage Vloop operates in a third interval, the loop circuit voltage Vloop causes the voltage matching module to act on the phase-shift pulse-width modulation controlling chip to generate a maximum duty ratio Dmax, and the loop circuit voltage Vloop causes the resistance controlling module to act on the pulse-width modulation controlling chip to generate frequency-modulating control.

The maximum duty ratio is 50%.

The first interval is a width-modulated voltage interval of the loop circuit voltage Vloop when the resonance circuit is in light load or no load state.

The third interval is a frequency-modulated voltage interval of the loop circuit voltage Vloop when the resonance circuit is in a heavy load state.

The loop circuit voltage Vloop is an output voltage which is an output voltage of the resonance circuit Vo having passed through a sampling circuit and a regulator.

Advantageous effects of the present invention are provided as follows. In the present invention, a controlling chip of the resonance circuit is connected to associated controlling means for providing voltage matching and resistance control to the modulating controlling chip. The controlling means provides controlling parameters to the modulating controlling chip in accordance with an input voltage, and the controlling chip modulates the resonance circuit accordingly. For example, the controlling chip may be width-modulated controlling chip or phase-shift pulse-width modulation controlling chip, in which a PWM generator and oscillator are connected to a voltage matching module and a resistance controlling module respectively. The voltage matching module and the resistance controlling module provide corresponding controlling parameters to the phase-shift pulse-width modulation controlling chip in accordance with the input voltage, and perform corresponding modulation. For example, the voltage matching module and the resistance controlling module use the loop circuit voltage Vloop as input voltage. When the loop circuit voltage Vloop operates in a first interval, in which Vloop is relatively small, and thus suggests that the converter is in light load or no load state, it causes the resistance controlling module to act on the phase-shift pulse-width modulation controlling chip to generate frequency-modulating control. At the same time, the loop circuit voltage Vloop causes the voltage matching module to act on the phase-shift pulse-width modulation controlling chip to generate width-modulating control. In such structure of system control, an operational amplifier U701 and simple separate elements are used in the voltage matching module, while a resistor or combination of resistors are connected to the RT terminal in the resistance controlling module. Compared with the prior art, the present invention is advantageous in its simple structure and low cost. Although same modulation performance is obtained, the present invention reduces the difficulty of designing magnetic elements and improves power efficiency.

DESCRIPTION OF THE EMBODIMENTS

The present invention will be further described according to the accompanying drawings and embodiments in details.

Embodiment 1

Figure 1:
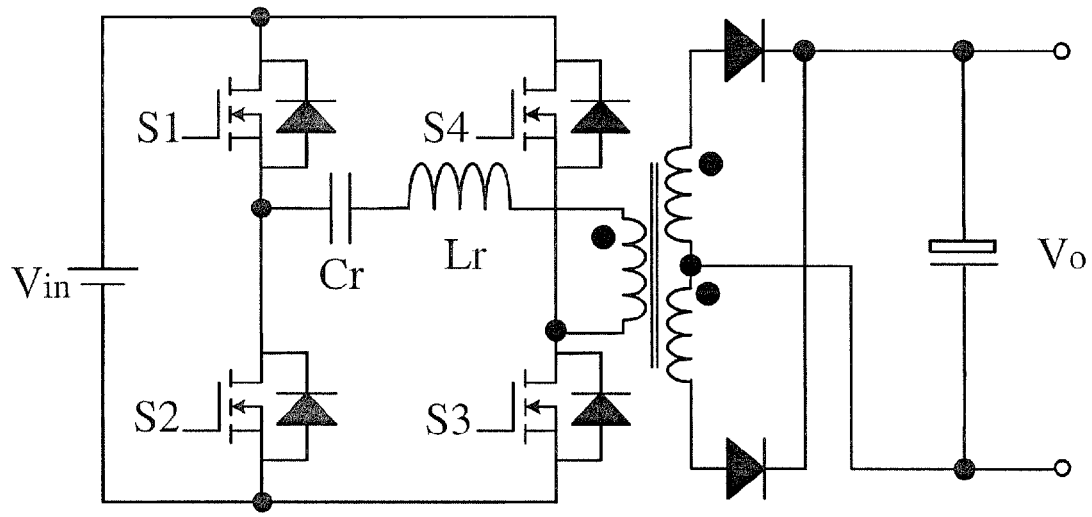
FIG. 1 is a schematic circuit diagram of a full bridge series resonance circuit.
Figure 2:
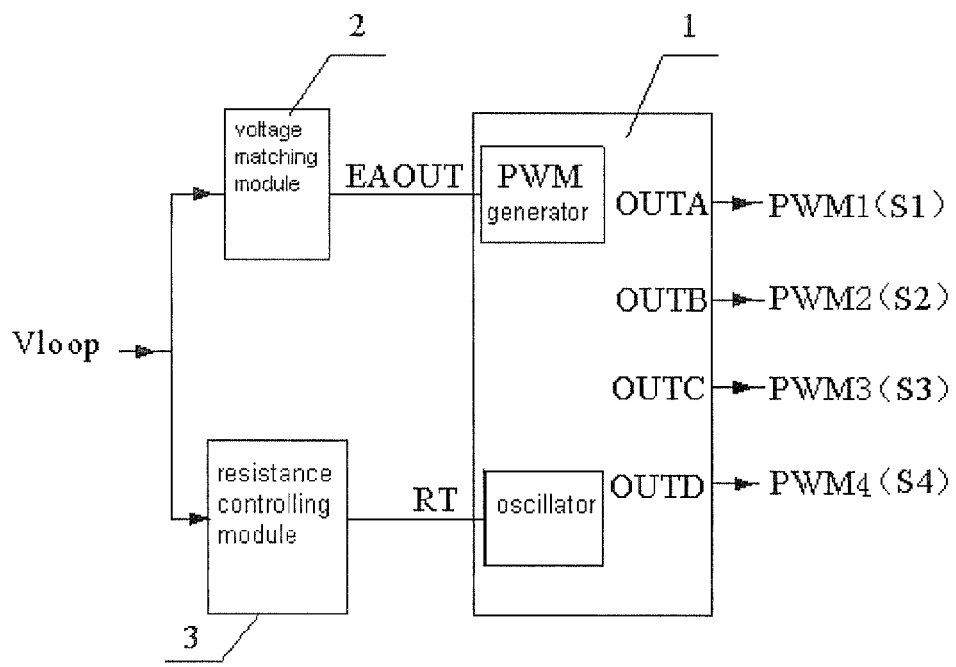
FIG. 2 is an overall schematic diagram of control structure according to the present invention where a phase-shift pulse-width modulation controlling chip is used.
Figure 3:
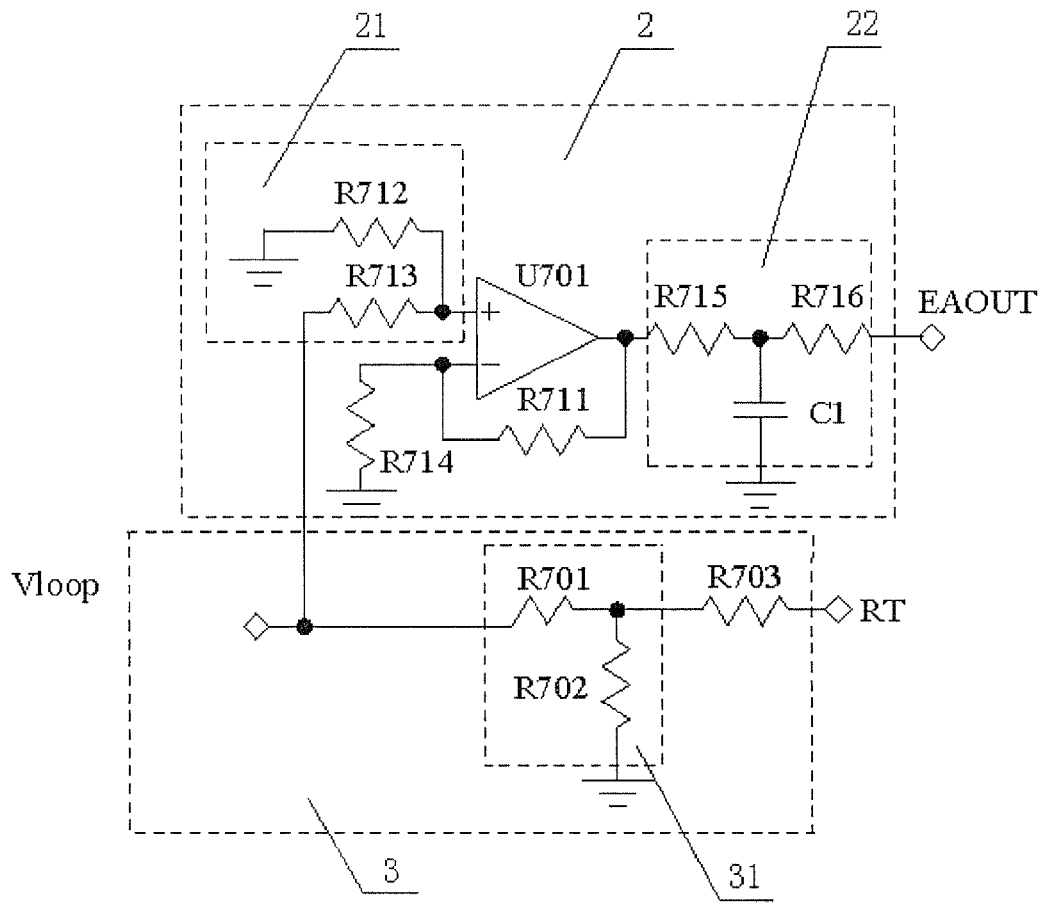
FIG. 3 is a schematic diagram of a voltage matching module and a resistance controlling module according to an embodiment 1 of the present invention where a phase-shift pulse-width modulation controlling chip is used.

As shown in FIGS. 2 and 3, the present invention includes a phase-shift pulse-width modulation controlling chip 1. In FIG. 2, EAOUT terminal of a PWM generator and RT terminal of an oscillator of the phase-shift pulse-width modulation controlling chip are connected to a voltage matching module 2 and a resistance controlling module 3 respectively. The voltage matching module 2 and the resistance controlling module 3 provide corresponding controlling parameters to the phase-shift pulse-width modulation controlling chip 1 in accordance with the input voltage (i.e., the loop circuit voltage Vloop). The phase-shift pulse-width modulation controlling chip 1 modulates the resonance circuit accordingly. In the full bridge circuit as shown in FIG. 1, S1, S2, S4 and S3 of the full bridge series resonance circuit are modulated by four output signals PWM1, PWM2, PWM3 and PWM 4 of the phase-shift pulse-width modulation controlling chip 1.

As shown in FIGS. 2 and 3, input voltages of the voltage matching module 2 and the resistance controlling module 3 are both loop circuit voltage Vloop. The loop circuit voltage Vloop is an output voltage which is an output voltage of the resonance circuit Vo passing through a sampling circuit and a regulator (such as, PID regulator). The voltage matching module 2 includes an operational amplifier U701 and a first voltage dividing sub-module 21, wherein, as shown in FIG. 3, a resistor R714 is connected between an inverting terminal of the operational amplifier U701 and the ground, and a resistor R711 is connected between the inverting terminal of the operational amplifier U701 and the output terminal.

As shown in FIG. 3, a non-inverting terminal of the operational amplifier U701 is connected to a voltage dividing terminal of the first voltage dividing sub-module 21. The first voltage dividing sub-module 21 includes series resistors R712 and R713, and is connected between the loop circuit voltage Vloop and the ground. The junction of the resistor R712 and resistor R713 is connected directly to the non-inverting terminal of the operational amplifier U701.

As shown in FIG. 3, a current limiting circuit 22 is connected between an output terminal of the operational amplifier U701 and the EAOUT terminal of the PWM generator in the phase-shift pulse-width modulation controlling chip 1. The current limiting circuit 22 includes series resistors R715, R716 and a capacitor C1. The resistors R715, R716 are connected in series between the output terminal of the operational amplifier U701 and the EAOUT terminal. The capacitor C1 is connected between the junction of the resistor R715 and the resistor R716 and the ground, wherein the capacitor C1 serves as voltage regulator and filter.

The voltage matching module 2 matches a phase-shift voltage interval corresponding to the loop circuit voltage Vloop with a voltage range in which the phase of the EAOUT terminal of the phase-shift pulse-width modulation controlling chip 1 is shifted. The specific scale parameters in the matching can be set in consideration of the parameters of the phase-shift pulse-width modulation controlling chip 1 and controlling parameters of the full bridge series resonance circuit.

As shown in FIGS. 2 and 3, the resistance controlling module 3 includes a second voltage dividing sub-module 31 which includes series resistors R701 and R702, and is connected between the loop circuit voltage Vloop and the ground. A resistor R703 is connected between the junction of the resistors R701, R702 and the RT terminal. The resistance controlling module 3 is connected between the loop circuit voltage Vloop and the RT terminal of the phase-shift pulse-width modulation controlling chip 1 such that the equivalent resistance of the RT terminal to the external is regulated accordingly as the loop circuit voltage Vloop changes.

Figure 4:
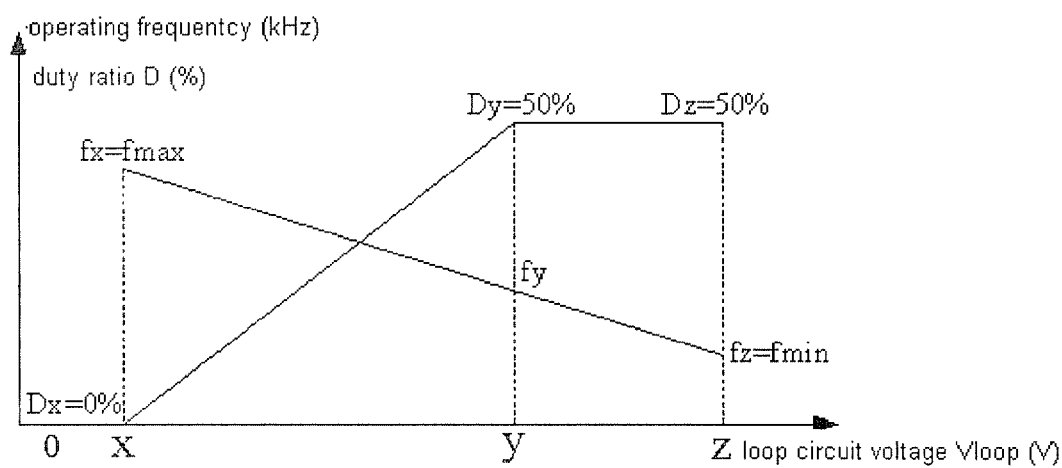
FIG. 4 shows the relation curves of loop circuit voltage versus operating frequency and duty ratio according to an embodiment 1 of the present invention where a phase-shift pulse-width modulation controlling chip is used.

The operating process of the present embodiment includes the following steps:

AA1. When the loop circuit voltage Vloop operates in a first interval, as shown in FIG. 4, i.e., when Vloop is lager than xV and smaller than yV, the loop circuit voltage Vloop causes the resistance controlling module 3 to act on the phase-shift pulse-width modulation controlling chip 1 to generate frequency-modulating control. At the same time, the loop circuit voltage Vloop causes the voltage matching module 2 to act on the phase-shift pulse-width modulation controlling chip 1 to generate width-modulating control.

Figure 6:
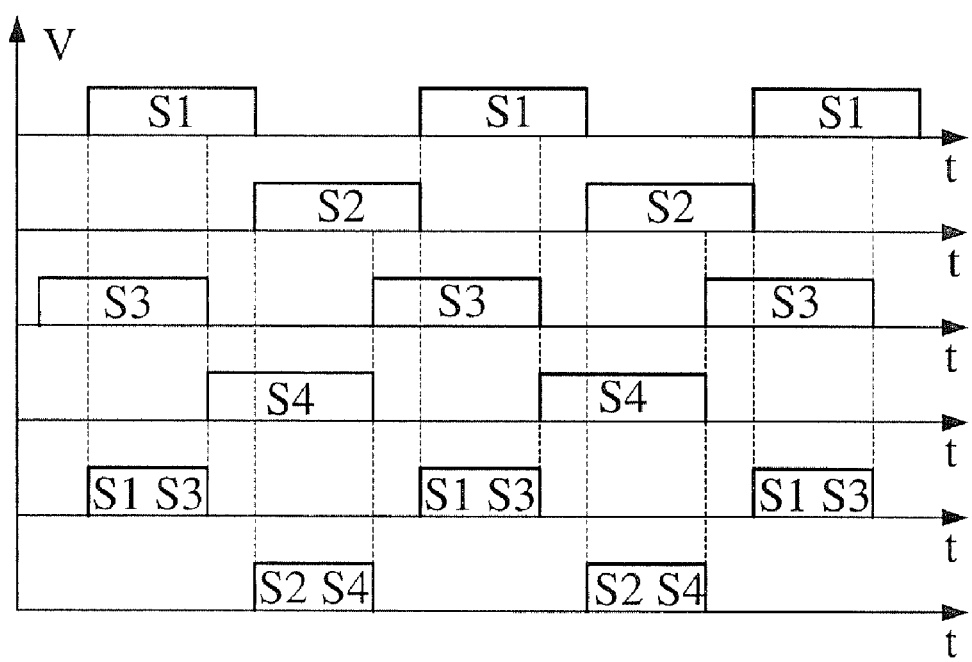
FIG. 6 is a schematic diagram of drive waveforms of four switch tubes in a full bridge resonance circuit operating in both frequency-modulated and width-modulated mode or width-modulated only mode.

When Vloop is lager than xV and smaller than yV, the converter is operating in light load or no load state. For example, operating interval of Vloop is [2, 6]V, after Vloop passes through the voltage matching module 2, as shown in FIG. 6, equivalent duty ratios of two switch tubes which are turned on simultaneously can be regulated by phase shifting, that is, PWM (pulse width modulation) control can be performed. The duty ratio changes from 0% to 50%. When the loop circuit voltage is xV, the corresponding duty ratio is 0%. When the loop circuit voltage is yV, the corresponding duty ratio is Dmax=50%.

At the same time, by means of the resistance controlling module 3 consisted of resistors R701, R702 and R703, the operating frequency is changed by changing equivalent resistance of the RT terminal to the external. That is, PFM control can be performed. When the loop circuit voltage increases from xV to yV, since xV is a minimum value of output voltage of the controlling loop circuit, and Vloop passes through resistors R701, R702 and R703, and the equivalent resistance of the RT terminal to the external is minimized. Therefore, the frequency of the output pulse from the phase-shift pulse-width modulation controlling chip is a maximum value fmax.

Therefore, Vloop is within the interval of [x, y], and PWM and PFM control can be performed simultaneously. The resonance circuit operates in both frequency-modulated and width-modulated mode.

It is obvious that when Vloop is smaller than xV, after Vloop passes through the voltage matching module consisted of the operational amplifier U701 and peripheral circuits thereof, the equivalent duty ratios of the two switch tubes which are turned on simultaneously are zero.

AA2. When the loop circuit voltage Vloop operates in a second interval, as shown in FIG. 4, i.e., when the loop circuit voltage Vloop is lager than yV and smaller than zV, the loop circuit voltage Vloop causes the voltage matching module 2 to act on the phase-shift pulse-width modulation controlling chip 1 to generate a maximum duty ratio Dmax, and the loop circuit voltage Vloop causes the resistance controlling module 3 to act on the phase-shift pulse-width modulation controlling chip 1 to generate frequency-modulating control.

Figure 5:
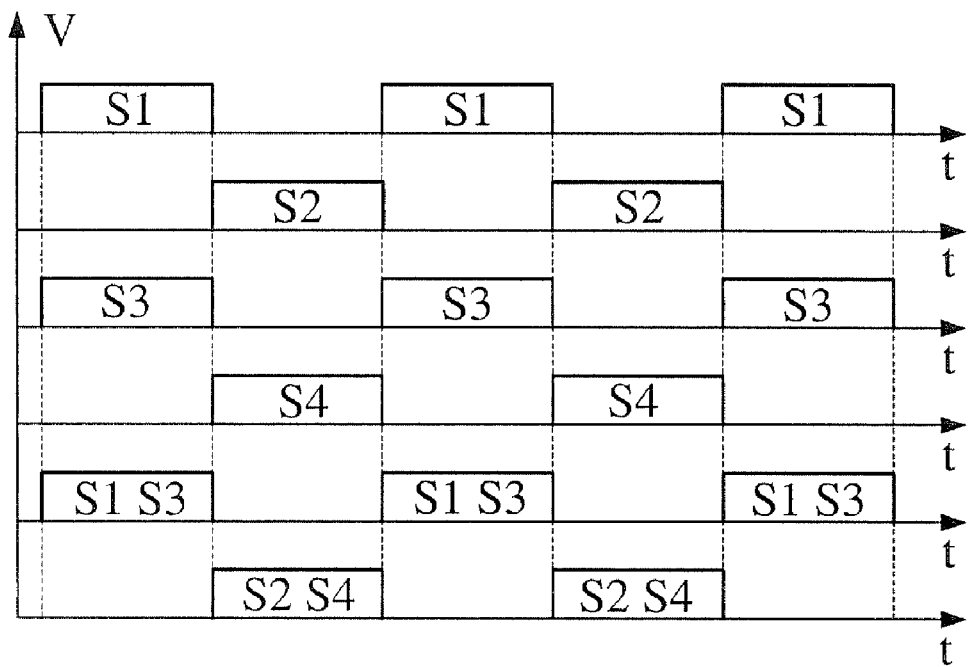
FIG. 5 is a schematic diagram of drive waveforms of four switch tubes in a full bridge resonance circuit operating in frequency-modulated only mode.

When Vloop is lager than yV and smaller than zV, the converter is operating in heavy load state. For example, at this time, operating interval of Vloop is [6, 12]V, after Vloop passes through the voltage matching module 2, as shown in FIG. 5, equivalent duty ratios of two switch tubes which are turned on simultaneously are both 50%.

At the same time, after Vloop passes through resistors R701, R702 and R703, the operating frequency is changed by changing equivalent resistance of the RT terminal to the external. That is, PFM control can be performed, and the operating frequency decreases as Vloop increases. When the value of Vloop is zV, since zV is a maximum value of output voltage of the controlling loop circuit, and Vloop passes through resistors R701, R702 and R703, and the equivalent resistance of the RT terminal to the external is maximized. Therefore, the frequency of the output pulse from the phase-shift pulse-width modulation controlling chip 1 is a minimum value fmin.

Embodiment 2

Figure 7:
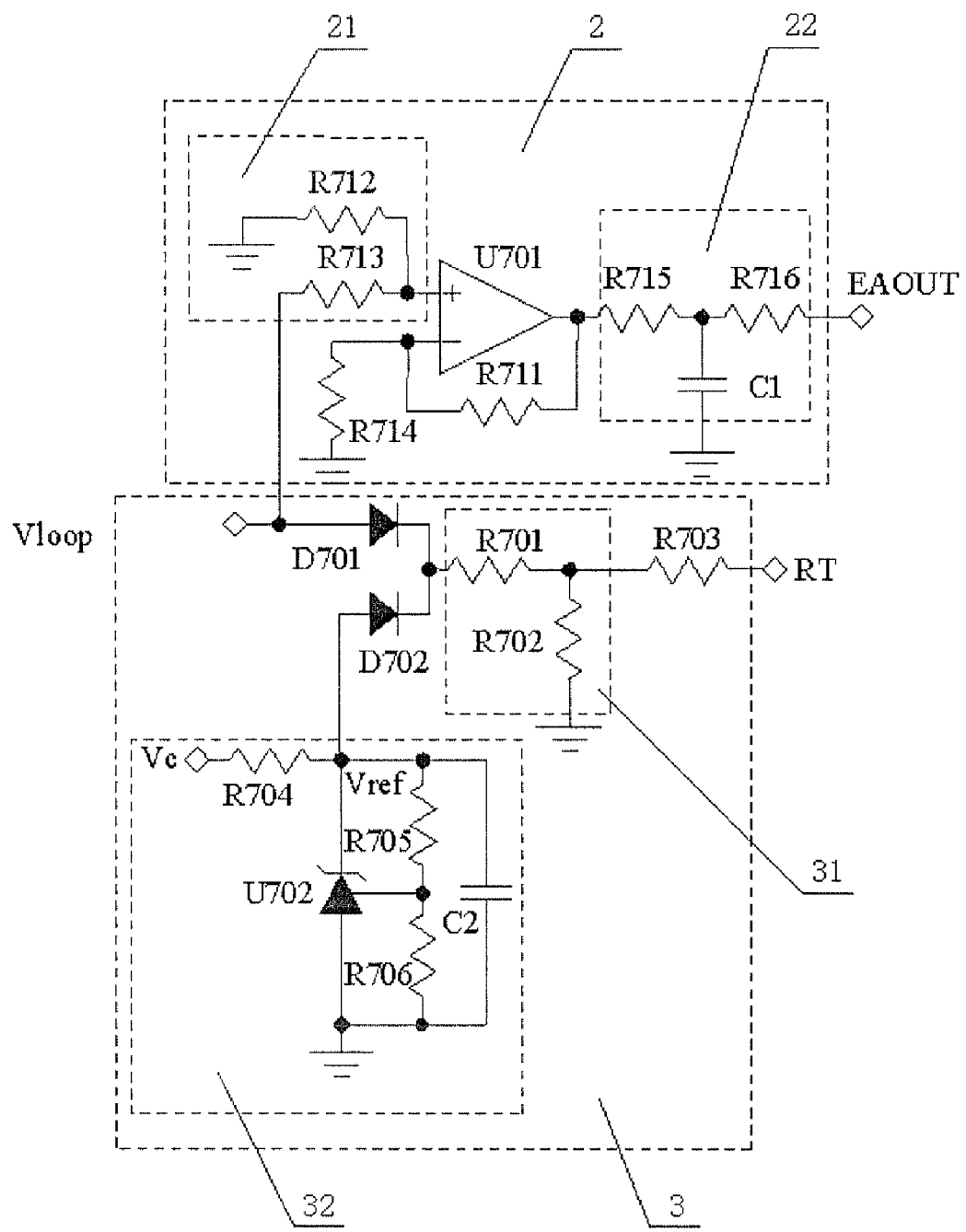
FIG. 7 is a schematic diagram of a voltage matching module and a resistance controlling module according to an embodiment 2 of the present invention where a phase-shift pulse-width modulation controlling chip is used.

The difference between the present embodiment and the embodiment 1 is that: in the present embodiment, as shown in FIG. 7, the resistance controlling module further includes a voltage-comparing sub-module 32. The voltage-comparing sub-module 32 generates reference level Vref A first diode D702 is connected between the reference level Vref and the input terminal of the second voltage-dividing sub-module 31, while a second diode D701 is connected between the loop circuit voltage Vloop and the input terminal of the second voltage-dividing sub-module 31, with cathodes of the first diode D702 and the second diode D701 being connected with the second voltage-dividing sub-module 31.

As shown in FIG. 7, a precision reference element U702 is applied in the voltage-comparing sub-module 32 to provide the reference level Vref. The power supply Vc is divided with resistors R704, R705 and R706, and a voltage drop of the resistor R706 provides operating voltage to the precision reference element U702. A filter capacitor C2 is connected between the reference level Vref and the ground.

Figure 8:
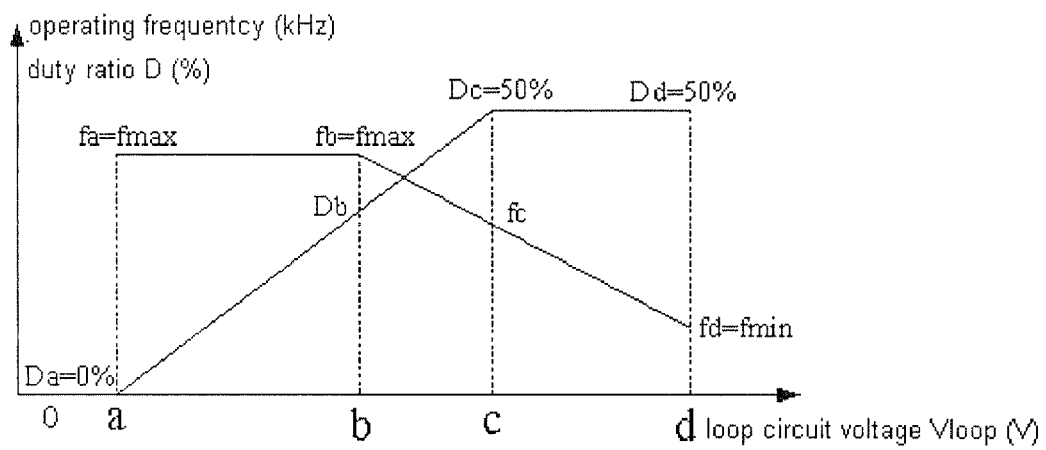
FIG. 8 shows the relation curves of loop circuit voltage versus operating frequency and duty ratio according to an embodiment 2 of the present invention where a phase-shift pulse-width modulation controlling chip is used.

The operating process of the present embodiment includes the following steps:

BA1. When the loop circuit voltage Vloop operates in a first interval, as shown in FIG. 8, i.e., when Vloop is lager than aV and smaller than bV, the resistance controlling module 3 generates a constant equivalent resistance to the phase-shift pulse-width modulation controlling chip 1, and causes it to output a maximum pulse frequency fmax. The loop circuit voltage Vloop causes voltage matching module 2 to act on the phase-shift pulse-width modulation controlling chip 1 to generate width-modulating control.

As shown in FIG. 8, Vloop is within an interval of [a, b]. At this time, the converter is operating in light load or no load state. For example, at this time, operating interval of Vloop is [2, 5]V, since the reference level Vref is bV (at this time, bV is 5V), the second diode D701 is turned off, the first diode D702 is turned on, and the reference level Vref (voltage value is bV) is kept unchanged, and the equivalent resistance of the RT terminal to the external is kept unchanged too. Therefore, the frequency of the output pulse from the phase-shift pulse-width modulation controlling chip 1 is kept at a maximum value fmax.

It is obvious that when Vloop is smaller than aV, after Vloop passes through the voltage matching module consisted of U701 and peripheral circuits thereof, the equivalent duty ratios of the two switch tubes which are turned on simultaneously are zero.

At the same time, as shown in FIG. 8, after Vloop passes through the voltage matching module 2, equivalent duty ratios of two switch tubes which are turned on simultaneously can be regulated by phase shifting. That is, PWM can be performed. When Vloop equals to aV, the duty ratio is 0%. The duty ratio increases from 0% to Db % as Vloop increases from aV to bV BA2. When the loop circuit voltage Vloop operates in a second interval, as shown in FIG. 8, i.e., when Vloop is lager than bV and smaller than cV, the loop circuit voltage Vloop causes the resistance controlling module 3 to act on the phase-shift pulse-width modulation controlling chip 1 to generate frequency-modulating control. At the same time, the loop circuit voltage Vloop causes voltage matching module 2 to act on the phase-shift pulse-width modulation controlling chip 1 to generate width-modulating control.

When Vloop is lager than bV and smaller than cV, at this time, the converter is operating in a state that is between light load and heavy load. For example, operating interval of Vloop is [5, 7]V, after Vloop pass through the voltage matching module 2, equivalent duty ratios of two switch tubes which are turned on simultaneously can be regulated by phase shifting. That is, PWM control can be performed. The duty ratio changes from Db % to 50%. When the loop circuit voltage is bV, the corresponding duty ratio is Db %. When the loop circuit voltage is cV, the corresponding duty ratio is a maximum value Dmax=50%.

At the same time, as shown in FIG. 8, the second diode D701 is turned on and the first diode D702 is turned off. Then, after Vloop passes through the resistance controlling module 3 consisted of resistors R701, R702 and R703, the operating frequency is changed by changing equivalent resistance of the RT terminal to the external. That is, PFM control can be performed. When the loop circuit voltage Vloop increases from bV to cV, the operating frequency decreases as the Vloop increases. When Vloop is bV, the frequency of the output pulse from the phase-shift pulse-width modulation controlling chip 1 is a maximum value fmax. When Vloop is cV, the frequency decreases to fc.

Therefore, Vloop is within the interval of [b, c], and PWM and PFM control can be performed simultaneously, with the resonance circuit operating in both frequency-modulated and width-modulated mode.

BA3. When the loop circuit voltage Vloop operates in a third interval, as shown in FIG. 8, i.e., when the loop circuit voltage Vloop is lager than cV and smaller than dV, the loop circuit voltage Vloop causes the voltage matching module 2 to act on the phase-shift pulse-width modulation controlling chip 1 to generate a maximum duty ratio Dmax, and the loop circuit voltage Vloop causes the resistance controlling module 3 to act on the phase-shift pulse-width modulation controlling chip 1 to generate frequency-modulating control. At this time, the third interval is a frequency-modulated voltage interval of Vloop when the resonance circuit is in heavy load state.

When Vloop is lager than cV and smaller than dV, the converter is operating in heavy load state. For example, operating interval of Vloop is [7, 12]V, after Vloop pass through the voltage matching module 2, as shown in FIG. 8, equivalent duty ratios of two switch tubes which are turned on simultaneously are both 50%.

At the same time, as shown in FIG. 8, the second diode D701 is turned on and the first diode D702 is turned off.

Then, after Vloop passes through resistors R701, R702 and R703, the operating frequency is changed by changing equivalent resistance of the RT terminal to the external. That is, PFM control can be performed, and the operating frequency decreases as Vloop increases. When the value of Vloop is dV, since dV is a maximum value of output voltage of the controlling loop circuit, and after Vloop passes through resistors R701, R702 and R703, the equivalent resistance of the RT terminal to the external is maximized. Therefore, the frequency of the output pulse from the phase-shift pulse-width modulation controlling chip 1 is a minimum value fmin.

Figure 9:
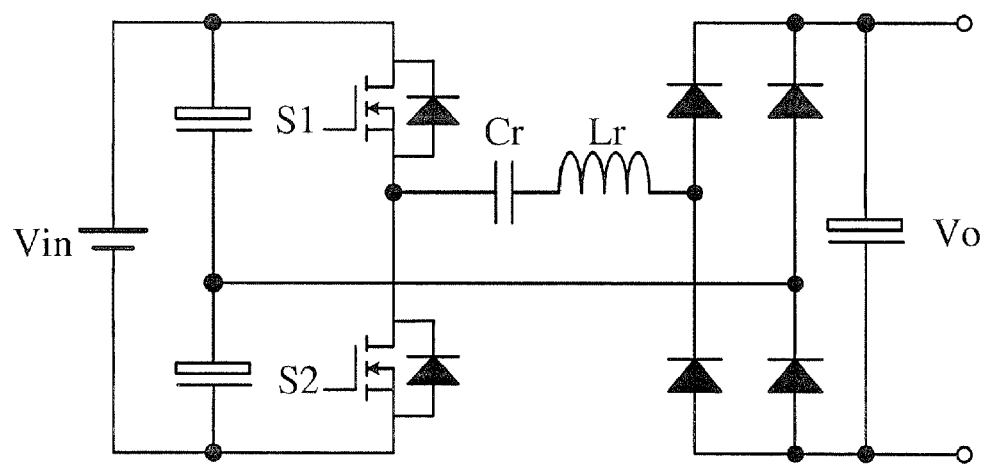
FIG. 9 is a schematic diagram of a half bridge series resonance circuit.

In the above embodiments, the control to the full bridge resonance circuit with phase-shift pulse-width modulation controlling chip 1 is shown. The present invention can be applied to control a half resonance circuit. As to the schematic diagram of half bridge series resonance circuit shown in FIG. 9, in practical application, it is only needed to perform a process of combining the four output signals PWM1, PWM2, PWM3, PWM4 in groups. For example, logic and is applied to the output signals PWM1 and PWM2 as well as PWM3 and PWM4 respectively. Then, S1, S2 in the half bridge series resonance circuit in FIG. 9 are modulated with the resultant two outputs respectively.

Thus, it has been described in details with the above embodiments and associated description that controlling modes of frequency-modulation, width-modulation and a combination thereof to the resonance circuit are realized, with the phase-shift pulse-width modulation controlling chip 1, through the voltage matching module 2 and the resistance controlling module 3.

Embodiment 3

Figure 11:
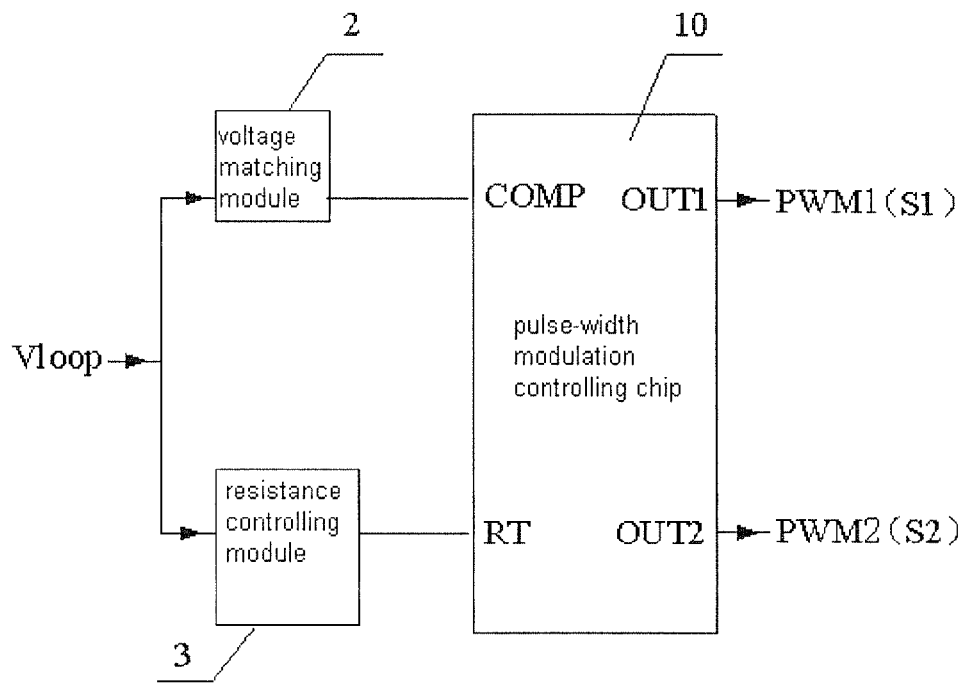
FIG. 11 is an overall schematic diagram of control structure according to the present invention where a pulse-width modulation controlling chip is used.
Figure 12:
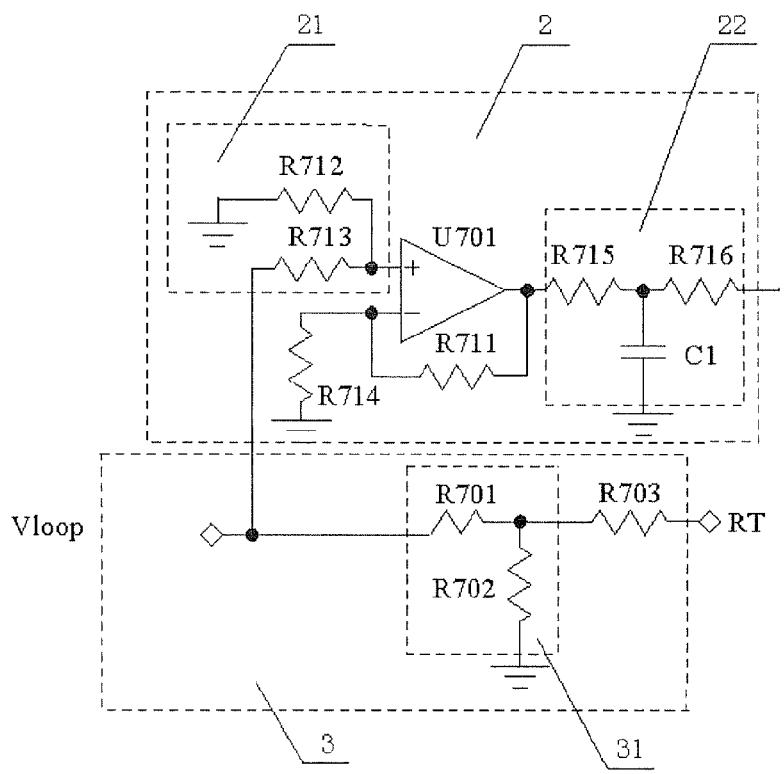
FIG. 12 is a schematic diagram of a voltage matching module and a resistance controlling module according to an embodiment 3 of the present invention where a pulse-width modulation controlling chip is used.

As shown in FIGS. 11 and 12, the present invention includes a pulse-width modulation controlling chip 10. In FIG. 11, COMP terminal and RT terminal of the pulse-width modulation controlling chip 10 are connected to a voltage matching module 2 and a resistance controlling module 3 respectively. The voltage matching module 2 and the resistance controlling module 3 provide corresponding controlling parameters to the pulse-width modulation controlling chip 10 in accordance with the input voltage (i.e., the loop circuit Vloop). The pulse-width modulation controlling chip 10 modulates the resonance circuit accordingly. In the half bridge series resonance circuit as shown in FIG. 1, S1, S2 of the half bridge series resonance circuit are modulated by two output signals PWM1, PWM2 of the phase-shift pulse-width modulation controlling chip 10.

As shown in FIGS. 11 and 12, input voltages of the voltage matching module 2 and the resistance controlling module 3 are both loop circuit voltage Vloop. The loop circuit voltage Vloop is an output voltage which is an output voltage of the resonance circuit Vo passing through a sampling circuit and a regulator (such as, PID regulator). The voltage matching module 2 includes an operational amplifier U701 and a first voltage dividing sub-module 21.

As shown in FIG. 12, a resistor R714 is connected between an inverting terminal of the operational amplifier U701 and the ground, and a resistor R711 is connected between the inverting terminal of the operational amplifier U701 and the output terminal.

As shown in FIG. 12, a non-inverting terminal of the operational amplifier U701 is connected to a voltage dividing terminal of the first voltage dividing sub-module 21. The first voltage dividing sub-module 21 includes series resistors R712 and R713, and is connected between the loop circuit voltage Vloop and the ground. The junction of resistors R712 and R713 is connected to the non-inverting terminal of the operational amplifier U701 directly.

As shown in FIG. 12, a current limiting circuit 22 is connected between an output terminal of the operational amplifier U701 and the COMP terminal in the pulse-width modulation controlling chip 10. The current limiting circuit 22 includes series resistors R715, R716 and a capacitor C1. The resistors R715, R716 are connected in series between the output terminal of the operational amplifier U701 and the RT terminal, and the capacitor C1 is connected between the junction of the resistor R715 and the resistor R716 and the ground, wherein the capacitor C1 serves as voltage regulator and filter.

The voltage matching module 2 matches a width-modulation voltage interval corresponding to the loop circuit voltage Vloop with a voltage range in which the width-modulation is performed for the COMP terminal of the pulse-width modulation controlling chip 10. The specific scale parameters in the matching can be set in consideration of parameters of the pulse-width modulation controlling chip 10 and operating parameters of the half bridge series resonance circuit.

As shown in FIGS. 11 and 12, the resistance controlling module 3 includes a second voltage dividing sub-module 31 which includes series resistors R701 and R702, and is connected between the loop circuit voltage Vloop and the ground. A resistor R703 is connected between the junction of the resistors R701, R702 and the RT terminal. The resistance controlling module 3 is connected between the loop circuit voltage Vloop and the RT terminal of the pulse-width modulation controlling chip 10 such that the equivalent resistance of the RT terminal to the external is regulated accordingly as the loop circuit voltage Vloop changes.

Figure 13:
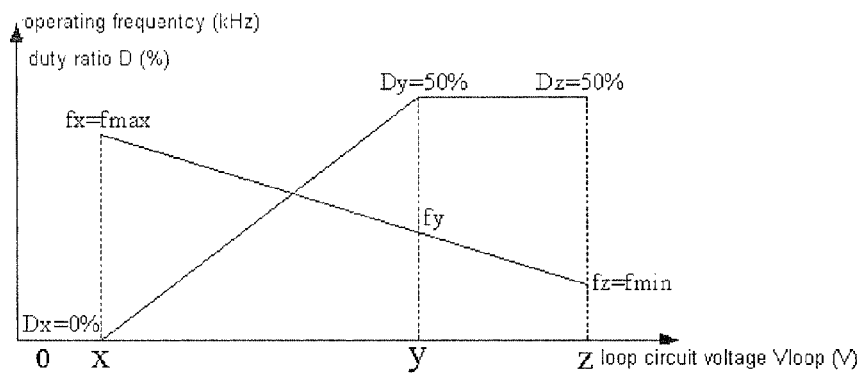
FIG. 13 shows the relation curves of loop circuit voltage versus operating frequency and duty ratio according to an embodiment 3 of the present invention where a phase-shift pulse-width modulation controlling chip is used.

The operating process of the present embodiment includes the following steps:

AB1. When the loop circuit voltage Vloop operates in a first interval, as shown in FIG. 13, i.e., when Vloop is lager than xV and smaller than yV, the loop circuit voltage Vloop causes the resistance controlling module 3 to act on the pulse-width modulation controlling chip 10 to generate frequency-modulating control. At the same time, the loop circuit voltage Vloop causes the voltage matching module 2 to act on the pulse-width modulation controlling chip 10 to generate width-modulating control.

Figure 10A:
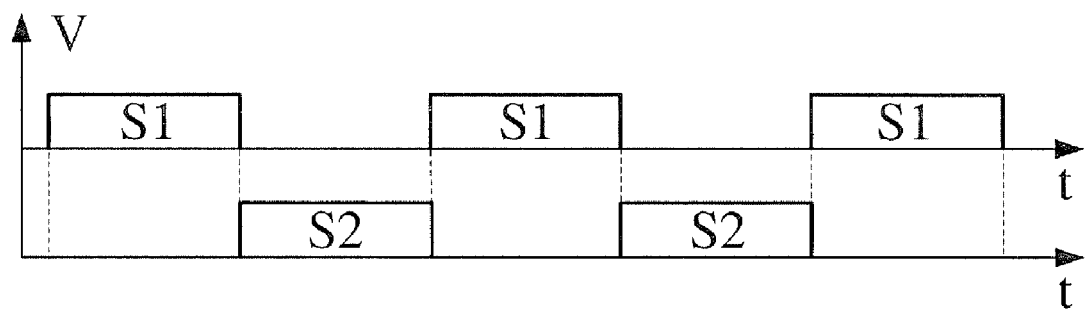
FIG. 10a is a schematic diagram of drive waveforms of two switch tubes in a half bridge resonance circuit operating in frequency-modulated only mode.
Figure 10B:
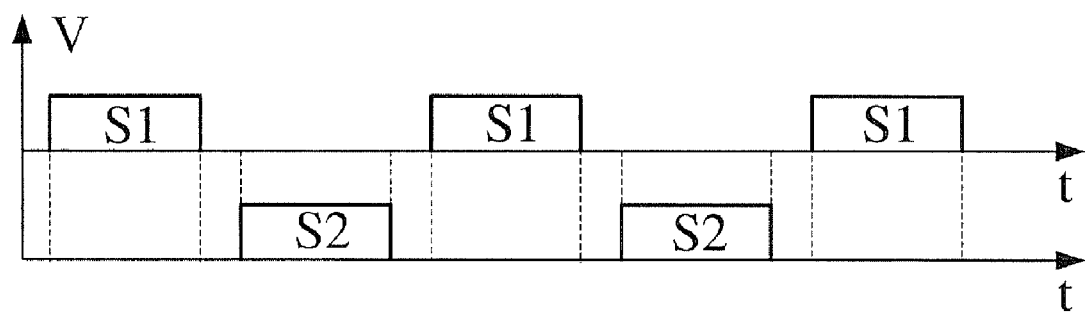
FIG. 10b is a schematic diagram of drive waveforms of two switch tubes in a half bridge resonance circuit operating in both frequency-modulated and width-modulated mode or width-modulated only mode.

When Vloop is lager than xV and smaller than yV, the converter is operating in light load or no load state. For example, operating interval of Vloop is [2, 6]V. After Vloop passes through the voltage matching module 2, as shown in FIG. 10b, duty ratios of the switch tubes can be regulated by width-modulating, that is, PWM (pulse width modulation) control can be performed. The duty ratio changes from 0% to 50%. When the loop circuit voltage is xV, the corresponding duty ratio is 0%. When the loop circuit voltage is yV, the corresponding duty ratio is 50%.

At the same time, through the resistance controlling module 3 consisted of resistors R701, R702 and R703, the operating frequency is changed by changing the equivalent resistance of the RT terminal to the external. That is, PFM control can be performed. When the loop circuit voltage increases from xV to yV, since xV is a minimum value of output voltage of the controlling loop circuit, after Vloop passes through resistors R701, R702 and R703, the equivalent resistance of the RT terminal to the external is minimized. Therefore, the frequency of the output pulse from the phase-shift pulse-width modulation controlling chip 10 is a maximum value fmax.

Therefore, Vloop is within the interval of [x, y], and PWM and PFM control can be performed simultaneously, with the resonance circuit operating in both frequency-modulated and width-modulated mode.

It is obvious that when Vloop is smaller than xV, after Vloop passes through the voltage matching module consisted of the operational amplifier U701 and peripheral circuits thereof, the equivalent the duty ratio of the switch tube is zero.

AB2. When the loop circuit voltage Vloop operates in a second interval, as shown in FIG. 13, i.e., when the loop circuit voltage Vloop is lager than yV and smaller than zV, the loop circuit voltage Vloop causes the voltage matching module 2 to act on the pulse-width modulation controlling chip 1 to generate a maximum duty ratio Dmax. The loop circuit voltage Vloop causes the resistance controlling module 3 to act on the pulse-width modulation controlling chip 10 to generate frequency-modulating control.

When Vloop is lager than yV and smaller than zV, at this time, the converter is operating in heavy load state. For example, at this time, operating interval of Vloop is [6, 12]V, after Vloop passes through the voltage matching module 2, as shown in FIG. 10a, duty ratios of two switch tubes are both 50%.

At the same time, after Vloop passes through resistors R701, R702 and R703, the operating frequency is changed by changing the equivalent resistance of the RT terminal to the external. That is, PFM control can be performed, and the operating frequency decreases as Vloop increases. When the value of Vloop is zV, since zV is a maximum value of output voltage of the controlling loop circuit, after Vloop passes through resistors R701, R702 and R703, and the equivalent resistance of the RT terminal to the external is maximized. Therefore, the frequency of the output pulse from the phase-shift pulse-width modulation controlling chip 10 is a minimum value fmin.

Embodiment 4

Figure 14:
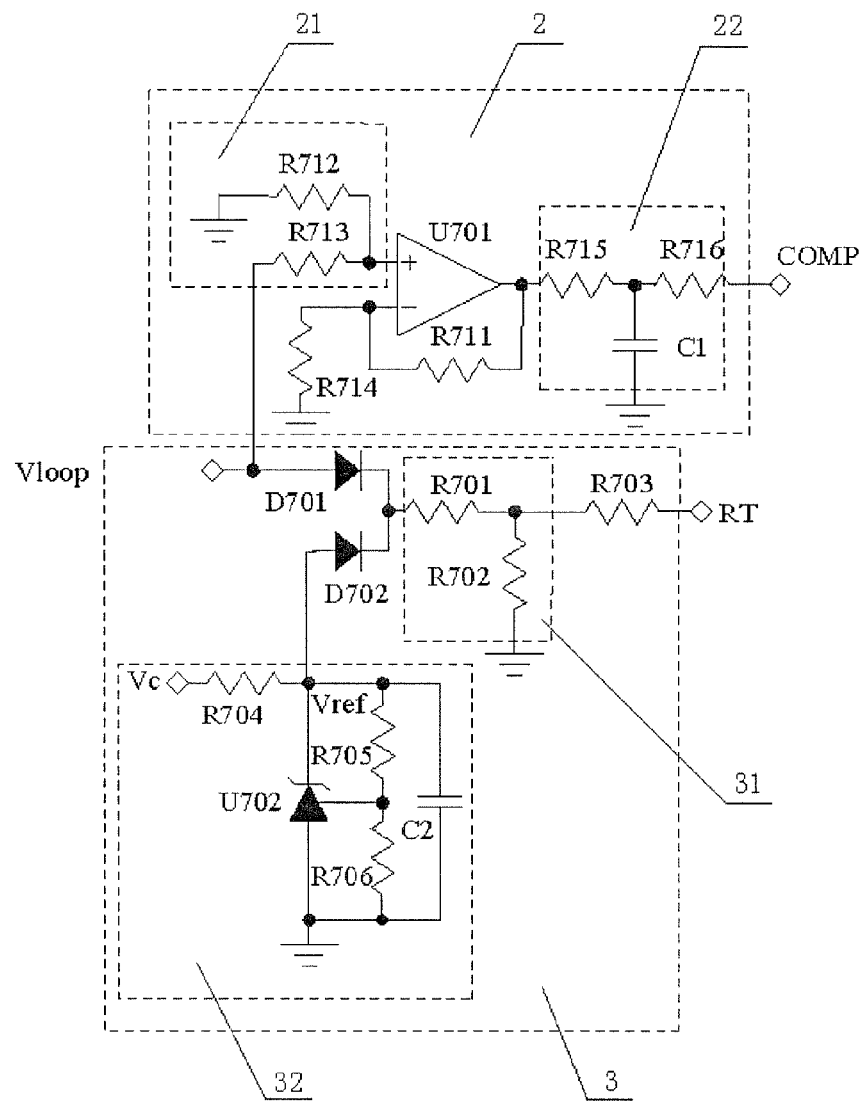
FIG. 14 is a schematic diagram of a voltage matching module and a resistance controlling module according to an embodiment 4 of the present invention where a pulse-width modulation controlling chip is used.

The difference between the present embodiment and embodiment 3 is that: in the present embodiment, as shown in FIG. 14, the resistance controlling module 3 further includes a voltage-comparing sub-module 32. The voltage-comparing sub-module 32 generates reference level Vref A first diode D702 is connected between the reference level Vref and the input terminal of the second voltage-dividing sub-module 31, while a second diode D701 is connected between the loop circuit voltage Vloop and the input terminal of the second voltage-dividing sub-module 31, with cathodes of the first diode D702 and the second diode D701 being connected with the second voltage-dividing sub-module 31.

As shown in FIG. 14, a precision reference element U702 is applied in the voltage-comparing sub-module 32 to provide the reference level Vref The power supply Vc is divided with resistors R704, R705 and R706, and a voltage drop of the resistor R706 provides operating voltage to the precision reference element U702. A filter capacitor C2 is connected between the reference level Vref and the ground.

Figure 15:
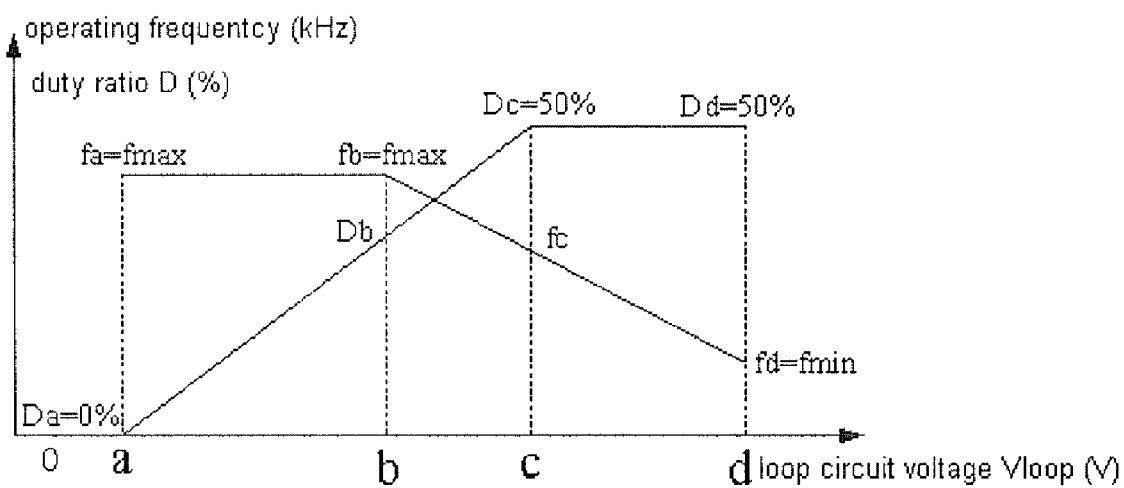
FIG. 15 shows the relation curves of loop circuit voltage versus operating frequency and duty ratio according to an embodiment 4 of the present invention where a phase-shift pulse-width modulation controlling chip is used.

The operating process of the present embodiment includes the following steps:

BB1. When the loop circuit voltage Vloop operates in a first interval, as shown in FIG. 15, i.e., when Vloop is lager than aV and smaller than bV, the resistance controlling module 3 generates a constant equivalent resistance to the pulse-width modulation controlling chip 1, and causes it to output a maximum pulse frequency fmax. The loop circuit voltage Vloop causes voltage matching module 2 to act on the pulse-width modulation controlling chip 10 to generate width-modulating control.

As shown in FIG. 15, Vloop is within an interval of [a, b], at this time, the converter is operating in light load or no load state. For example, at this time, operating interval of Vloop is [2, 5]V, since the reference level Vref is bV (at this time, bV is 5V), the second diode D701 is turned off, the first diode D702 is turned on, and the reference level Vref (voltage value is bV) is kept unchanged, and the equivalent resistance of the RT terminal to the external is kept unchanged too. Therefore, the frequency of the output pulse from the phase-shift pulse-width modulation controlling chip 1 is kept at a maximum value fmax.

It is obvious that when Vloop is smaller than aV, after Vloop passes through the voltage matching module consisted of U701 and peripheral circuits thereof, the duty ratio of the switch tube is zero.

At the same time, as shown in FIG. 15, after Vloop passes through the voltage matching module 2, the duty ratios of the switch tube can be regulated, that is, PWM can be performed. When Vloop equals to aV, the duty ratio is 0%, and the duty ratio increases from 0% to Db % as Vloop increases from aV to bV BB2. When the loop circuit voltage Vloop operates in a second interval, as shown in FIG. 15, i.e., when Vloop is lager than bV and smaller than cV, the loop circuit voltage Vloop causes the resistance controlling module 3 to act on the pulse-width modulation controlling chip 10 to generate frequency-modulating control. At the same time, the loop circuit voltage Vloop causes the voltage matching module 2 to act on the pulse-width modulation controlling chip 10 to generate width-modulating control.

When Vloop is lager than bV and smaller than cV, at this time, the converter is operating in a state that is between light load and heavy load. For example, operating interval of Vloop is [5, 7]V, after Vloop passes through the voltage matching module 2, the duty ratios of the switch tube can be regulated. That is, PWM control can be performed. The duty ratio changes from Db % to 50%. When the loop circuit voltage is bV, and the corresponding duty ratio is Db %. When the loop circuit voltage is cV, the corresponding duty ratio is a maximum value Dmax=50%.

At the same time, as shown in FIG. 15, the second diode D701 is turned on and the first diode D702 is turned off. Then, after Vloop passes through the resistance controlling module 3 consisted of resistors R701, R702 and R703, the operating frequency is changed by changing equivalent resistance of the RT terminal to the external, that is, PFM control can be performed. When the loop circuit voltage Vloop increases from bV to cV, the operating frequency decreases as the Vloop increases. When Vloop is bV, the frequency of the output pulse from the pulse-width modulation controlling chip 10 is a maximum value fmax. When Vloop is cV, the frequency decreases to fc.

Therefore, Vloop is within the interval of [b, c], and PWM and PFM control can be performed simultaneously, with the resonance circuit operating in both frequency-modulated and width-modulated mode.

BB3. When the loop circuit voltage Vloop operates in a third interval, as shown in FIG. 15, i.e., when the loop circuit voltage Vloop is lager than cV and smaller than dV, the loop circuit voltage Vloop causes the voltage matching module 2 to act on the phase-shift pulse-width modulation controlling chip 10 to generate a maximum duty ratio Dmax, and the loop circuit voltage Vloop causes the resistance controlling module 3 to act on the pulse-width modulation controlling chip 10 to generate frequency-modulating control.

When Vloop is lager than cV and smaller than dV, the converter is operating in heavy load state. For example, operating interval of Vloop is [7, 12]V, after Vloop passes through the voltage matching module 2, as shown in FIG. 15, the duty ratio of the switch tube is 50%.

At the same time, as shown in FIG. 15, the second diode D701 is turned on and the first diode D702 is turned off. Then, after Vloop passes through resistors R701, R702 and R703, the operating frequency is changed by changing the equivalent resistance of the RT terminal to the external. That is, PFM control can be performed. The operating frequency decreases as Vloop increases. When Vloop is dV, since dV is a maximum value of output voltage from the controlling loop circuit, after Vloop passes through resisters R701, R702 and R703, the equivalent resistance of the RT terminal to the external is maximized. Therefore, the output pulse from the pulse-width modulation controlling chip 10 is a minimum value fmin.

In the above embodiments, the control to the half bridge resonance circuit using pulse-width modulation controlling chip 10 is shown. The present invention also can be applied to control a full bridge resonance circuit. As to the schematic diagram of full bridge series resonance circuit shown in FIG. 1, in practical application, it only needs to modulate S1, S2, S3, S4 of the full series resonance circuit in FIG. 1 with the two output signals PWM1, PWM2 from the pulse-width modulation controlling chip 10 in groups. For example, the output signals PWM1 from the pulse-width modulation controlling chip 10 controls S1 and S3 of the full series resonance circuit simultaneously, and the output signals PWM2 from the pulse-width modulation controlling chip 10 controls S2 and S4 of the full bridge series resonance circuit simultaneously.

In the present invention, the maximum duty ratio of the output pulse from the controlling chip is described as 50%, and two switch tubes of the same bridge arm are turned on complementally, and the overall duty ratio is 1. This way of the description is based on the situation in which the dead time of the two drive pulses is not considered. It is necessary to set a certain dead time between the two drive pulses, in order that the two switch tubes of the same bridge arm are not straight through, so in fact, the maximum duty ratio of the output pulse from the controlling chip is certainly smaller than 50%, and two switch tubes of the same bridge arm are turned on complementally, and the overall duty ratio is smaller than 1. At the same time, in order to improve the operating performance, the dead time between two drive pulses can be regulated by means of design of the circuit. Therefore, the above description shows an ideal state, but this will not limit the circuit design according to the present invention.

Thus, it has been described in details with the above embodiments and associated description that controlling modes of frequency-modulation, width-modulation and a combination thereof to the resonance circuit are realized, with the phase-shift pulse-width modulation controlling chip 1, through the voltage matching module 2 and the resistance controlling module 3.

The invention claimed is:

1. A modulation control system for a resonance circuit, wherein a controlling chip of the resonance circuit is connected to an associated controlling means that provides voltage matching and resistance control to the controlling chip, the controlling means providing controlling parameters to a modulating controlling chip in accordance with an input voltage, the controlling chip modulating the resonance circuit accordingly;

wherein the controlling chip is a phase-shift pulse-width modulation controlling chip, a PWM generator and an oscillator communicating with a respective voltage matching module and a resistance controlling module of the controlling means, respectively; the voltage matching module and the resistance controlling module providing the controlling parameters to the phase-shift pulse-width modulation controlling chip in accordance with the input voltage, the phase-shift pulse-width modulation controlling chip modulating the resonance circuit accordingly;

wherein both the voltage matching module and the resistance controlling module use a loop circuit voltage as the input voltage;

the voltage matching module matches a phase-shift voltage interval corresponding to the loop circuit voltage with a voltage range in which the phase is shifted by the PWM generator of the phase-shift pulse-width modulation controlling chip; and the resistance controlling module is connected between the loop circuit voltage and the oscillator of the phase-shift pulse-width modulation controlling chip such that an equivalent resistance of the oscillator to the external is regulated accordingly as the loop circuit voltage changes.

2. The modulation control system for a resonance circuit according to claim 1, wherein the voltage matching module comprises an operational amplifier, a first voltage dividing sub-module and a current limiting circuit, and wherein a resistor is connected between an inverting terminal of the operational amplifier and ground, while a resistor is connected between the inverting terminal of the operational amplifier and an output terminal;

a non-inverting terminal of the operational amplifier is connected to a voltage dividing terminal of the first voltage dividing sub-module; and the current limiting circuit is connected between the output terminal of the operational amplifier and the PWM generator of the phase-shift pulse-width modulation controlling chip.

3. The modulation control system for a resonance circuit according to claim 2, wherein the first voltage dividing sub-module comprises series resistors, and is connected between the loop circuit voltage and the ground.

4. The modulation control system for a resonance circuit according to claim 2, wherein the resistance controlling module comprises a second voltage dividing sub-module, a resistor being connected between a voltage dividing terminal of the second voltage dividing sub-module and the oscillator of the phase-shift pulse-width modulation controlling chip.

5. The modulation control system for a resonance circuit according to claim 4, wherein the second voltage dividing sub-module comprises series resistors, and is connected between the loop circuit voltage and the ground.

6. The modulation control system for a resonance circuit according to claim 4, wherein the resistance controlling module further comprises a voltage-comparing sub-module that generates a reference level Vref, and wherein a first diode is connected between the reference level Vref and the input terminal of the second voltage-dividing sub-module, while a second diode is connected between the loop circuit voltage and the input terminal of the second voltage-dividing sub-module, with cathodes of the first diode and the second diode being connected with the second voltage-dividing sub-module.

7. A modulation control system for a resonance circuit, wherein a controlling chip of the resonance circuit is connected to an associated controlling means that provide voltage matching and resistance control to the controlling chip, the controlling means providing controlling parameters to a modulating controlling chip in accordance with an input voltage, the controlling chip modulating the resonance circuit accordingly;

wherein the controlling chip is a pulse-width modulation controlling chip, a COMP terminal and a RT terminal of which are connected to a voltage matching module and a resistance controlling module of the controlling means, respectively, the voltage matching module and the resistance controlling module providing the controlling parameters to the pulse-width modulation controlling chip in accordance with the input voltage, the pulse-width modulation controlling chip modulating the resonance circuit accordingly;

wherein both the voltage matching module and the resistance controlling module use the loop circuit voltage as the input voltage;

the voltage matching module matches a width-modulated voltage interval corresponding to the loop circuit voltage with a voltage range in which the phase is width-modulated by the COMP terminal of the pulse-width modulation controlling chip; and the resistance controlling module is connected between the loop circuit voltage and the RT terminal of the pulse-width modulation controlling chip such that an equivalent resistance of the RT terminal to the external is regulated accordingly as the loop circuit voltage changes.

8. The modulation control system for a resonance circuit according to claim 7, wherein the voltage matching module comprises an operational amplifier, a first voltage dividing sub-module and a current limiting circuit, and wherein a resistor is connected between an inverting terminal of the operational amplifier and ground, while a resistor is connected between the inverting terminal of the operational amplifier and an output terminal;

a non-inverting terminal of the operational amplifier is connected to a voltage dividing terminal of the first voltage dividing sub-module;

the current limiting circuit is connected between the output terminal of the operational amplifier and the COMP terminal of the pulse-width modulation controlling chip.

9. The modulation control system for a resonance circuit according to claim 8, wherein the first voltage dividing sub-module comprises series resistors, and is connected between the loop circuit voltage and the ground.

10. The modulation control system for a resonance circuit according to claim 8, wherein the resistance controlling module comprises a second voltage dividing sub-module, wherein a resistor is connected between a voltage dividing terminal of the second voltage dividing sub-module and the oscillator of the phase-shift pulse-width modulation controlling chip.

11. The modulation control system for a resonance circuit according to claim 10, wherein the second voltage dividing sub-module comprises series resistors, and is connected between the loop circuit voltage and the ground.

12. The modulation control system for a resonance circuit according to claim 10, wherein the resistance controlling module further comprises a voltage-comparing sub-module that generates a reference level Vref, and wherein a first diode is connected between the reference level Vref and the input terminal of the second voltage-dividing sub-module, while a second diode is connected between the loop circuit voltage and the input terminal of the second voltage-dividing sub-module, with cathodes of the first diode and the second diode being connected with the second voltage-dividing sub-module.

13. A modulation control method for a resonance circuit, comprising using a phase-shift pulse-width modulation controlling chip is used so as to control modes for the resonance circuit through a voltage matching module and a resistance controlling module, wherein both the voltage matching module and the resistance controlling module use a loop circuit voltage as an input voltage, when the loop circuit voltage operates in a first interval, the loop circuit voltage causes the resistance controlling module to act on the phase-shift pulse-width modulation controlling chip to generate frequency-modulating control and at the same time, the loop circuit voltage causes the voltage matching module to act on the phase-shift pulse-width modulation controlling chip to generate width-modulating control; and when the loop circuit voltage operates in a second interval, the loop circuit voltage causes the voltage matching module to act on the phase-shift pulse-width modulation controlling chip to generate a maximum duty ratio, and the loop circuit voltage causes the resistance controlling module to act on the phase-shift pulse-width modulation controlling chip to generate frequency-modulating control.

14. The modulation control method for a resonance circuit according to claim 13, wherein the maximum duty ratio is 50%.

15. The modulation control method for a resonance circuit according to claim 13, wherein a first interval is a phase-shift voltage interval of a loop circuit voltage when the resonance circuit is in light load or no load state.

16. The modulation control method for a resonance circuit according to claim 13, wherein the method comprising:

when the loop circuit voltage operates in a first interval, the resistance controlling module generates a constant equivalent resistance to the phase-shift pulse-width modulation controlling chip, and causes it to output a maximum pulse frequency, and the loop circuit voltage causes voltage matching module to act on the phase-shift pulse-width modulation controlling chip to generate width-modulating control;

when the loop circuit voltage operates in a second interval, the loop circuit voltage causes the resistance controlling module to act on the phase-shift pulse-width modulation controlling chip to generate frequency-modulating control; and at the same time, the loop circuit voltage causes the voltage matching module to act on the phase-shift pulse-width modulation controlling chip to generate width-modulating control; and when the loop circuit voltage operates in a third interval, the loop circuit voltage causes the voltage matching module to act on the phase-shift pulse-width modulation controlling chip to generate a maximum duty ratio, and the loop circuit voltage causes the resistance controlling module to act on the phase-shift pulse-width modulation controlling chip to generate frequency-modulating control.

17. The modulation control method for a resonance circuit according to claim 16, wherein the third interval is a phase-shift voltage interval of the loop circuit voltage when the resonance circuit is in a heavy load state.

18. The modulation control method for a resonance circuit according to claim 16, wherein the maximum duty ratio is 50%.

19. A modulation control method for a resonance circuit comprising using a pulse-width modulation controlling chip control modes for the resonance circuit through a voltage matching module and a resistance controlling module; wherein both the voltage matching module and the resistance controlling module use a loop circuit voltage as an input voltage;
when the loop circuit voltage operates in a first interval, the loop circuit voltage causes the resistance controlling module to act on the pulse-width modulation controlling chip to generate freguency-modulating control; and at the same time, the loop circuit voltage causes the voltage matching module to act on the pulse-width modulation controlling chip to generate width-modulating control; and
when the loop circuit voltage operates in a second interval, the loop circuit voltage causes the voltage matching module to act on the pulse-width modulation controlling chip to generate a maximum duty ratio, and the loop circuit voltage causes the resistance controlling module to act on the pulse-width modulation controlling chip to generate frequency-modulating control.

20. The modulation control method for a resonance circuit according to claim 19, wherein the maximum duty ratio is 50%.

21. The modulation control method for a resonance circuit according to claim 19, wherein the first interval is a width-modulated voltage interval of the loop circuit voltage when the resonance circuit is in light load or no load state.

22. The modulation control method for a resonance circuit according to claim 19, wherein the loop circuit voltage is an output voltage which is an output voltage of the resonance circuit Vo having passed through a sampling circuit and a regulator.

23. The modulation control method for a resonance circuit according to claim 19, wherein the method comprises the following steps:
when the loop circuit voltage operates in a first interval, the resistance controlling module generates a constant equivalent resistance to the pulse-width modulation controlling chip, and causes it to output a maximum pulse frequency, and the loop circuit voltage causes voltage matching module to act on the pulse-width modulation controlling chip to generate width-modulating control;
when the loop circuit voltage operates in a second interval, the loop circuit voltage causes the resistance controlling module to act on the pulse-width modulation controlling chip to generate frequency-modulating control; and at the same time, the loop circuit voltage causes the voltage matching module to act on the pulse-width modulation controlling chip to generate width-modulating control; and
when the loop circuit voltage operates in a third interval, the loop circuit voltage causes the voltage matching module to act on the phase-shift pulse-width modulation controlling chip to generate a maximum duty ratio, and the loop circuit voltage causes the resistance controlling module to act on the pulse-width modulation controlling chip to generate frequency-modulating control.

24. The modulation control method for a resonance circuit according to claim 23, wherein the third interval is a frequency-modulated voltage interval of the loop circuit voltage when the resonance circuit is in a heavy load state.

25. The modulation control method for a resonance circuit according to claim 23, wherein the maximum duty ratio is 50%.

26. The modulation control method for a resonance circuit according to claim 23, wherein the first interval is a width-modulated voltage interval of the loop circuit voltage when the resonance circuit is in light load or no load state.

27. The modulation control method for a resonance circuit according to claim 23, wherein the loop circuit voltage is an output voltage which is an output voltage of the resonance circuit Vo having passed through a sampling circuit and a regulator.

* * * * *